United States Patent

Nelson et al.

[11] Patent Number: 6,068,400
[45] Date of Patent: May 30, 2000

[54] TEMPERATURE COMPENSATED ADAPTER FOR A DMM

[75] Inventors: Theodore G. Nelson, Portland; Clifford E. Baker, Hillsboro, both of Oreg.

[73] Assignee: Tektronix, Inc., Beaverton, Oreg.

[21] Appl. No.: 09/032,637

[22] Filed: Feb. 27, 1998

[51] Int. Cl.$^7$ .............................. G01K 1/00; H01L 35/10
[52] U.S. Cl. ..................... 374/179; 374/208; 439/329
[58] Field of Search .................................. 374/179, 181, 374/208; 439/329

[56] References Cited

U.S. PATENT DOCUMENTS

| | | | |
|---|---|---|---|
| 4,669,049 | 5/1987 | Kosednar et al. | 374/181 |
| 4,718,777 | 1/1988 | Mydynski et al. | 374/181 |
| 4,776,706 | 10/1988 | Loiterman et al. | 374/208 |
| 5,090,918 | 2/1992 | Zoelick et al. | 439/487 |
| 5,492,482 | 2/1996 | Lockman et al. | 439/329 |
| 5,648,712 | 7/1997 | Hahn | 320/111 |
| 5,735,605 | 4/1998 | Blalock | 374/179 |
| 5,836,692 | 11/1998 | Pompei | 374/133 |

*Primary Examiner*—G. Bradley Bennett
*Assistant Examiner*—Gail Verbitsky
*Attorney, Agent, or Firm*—Boulden G. Griffith; Thomas F. Lenihan

[57] ABSTRACT

An adapter suitable for use with a handheld multimeter and a thermocouple probe contains a temperature sensor and input connectors suitable for mating with standard thermocouple probes. Both of these are closely coupled thermally to an isothermal domain. Plugs suitable for mating with the input jacks of a handheld multimeter are disposed within the adapter on the other side of a high thermal resistance zone. Conductors connect these outputs to the input connectors and to the leads of the temperature sensor. A four output version of the adapter is shown for use with a three lead temperature sensor, and a three output version is shown for use with a two lead temperature sensor. The output plugs can paired to be more compact and easier to use through the use of dual-signal single-axis banana plugs.

13 Claims, 4 Drawing Sheets

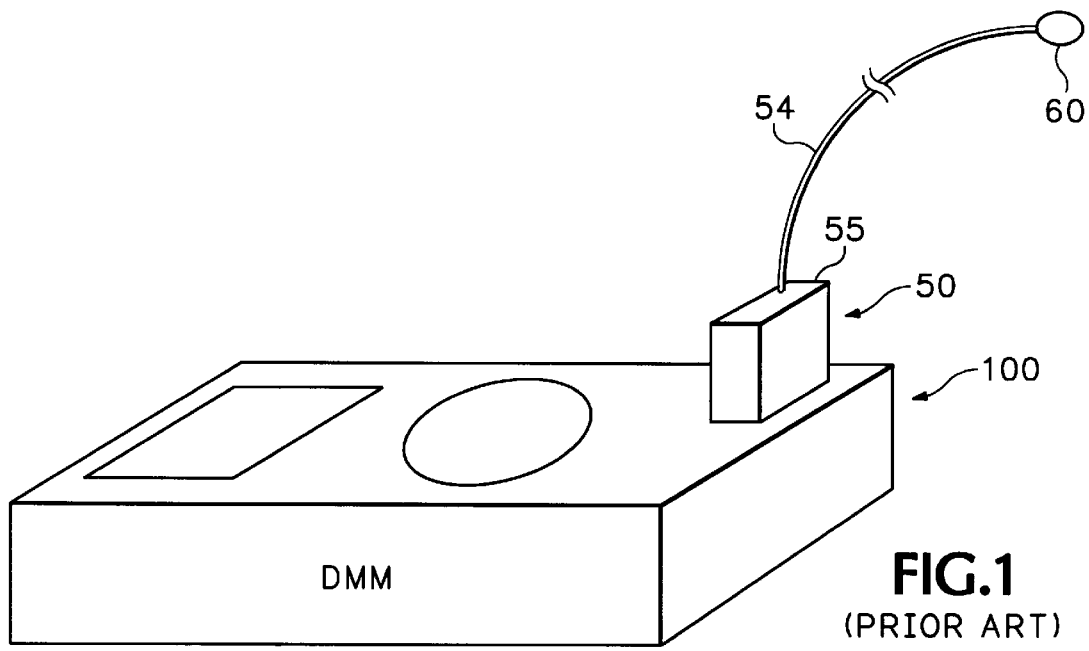
FIG. 1
(PRIOR ART)
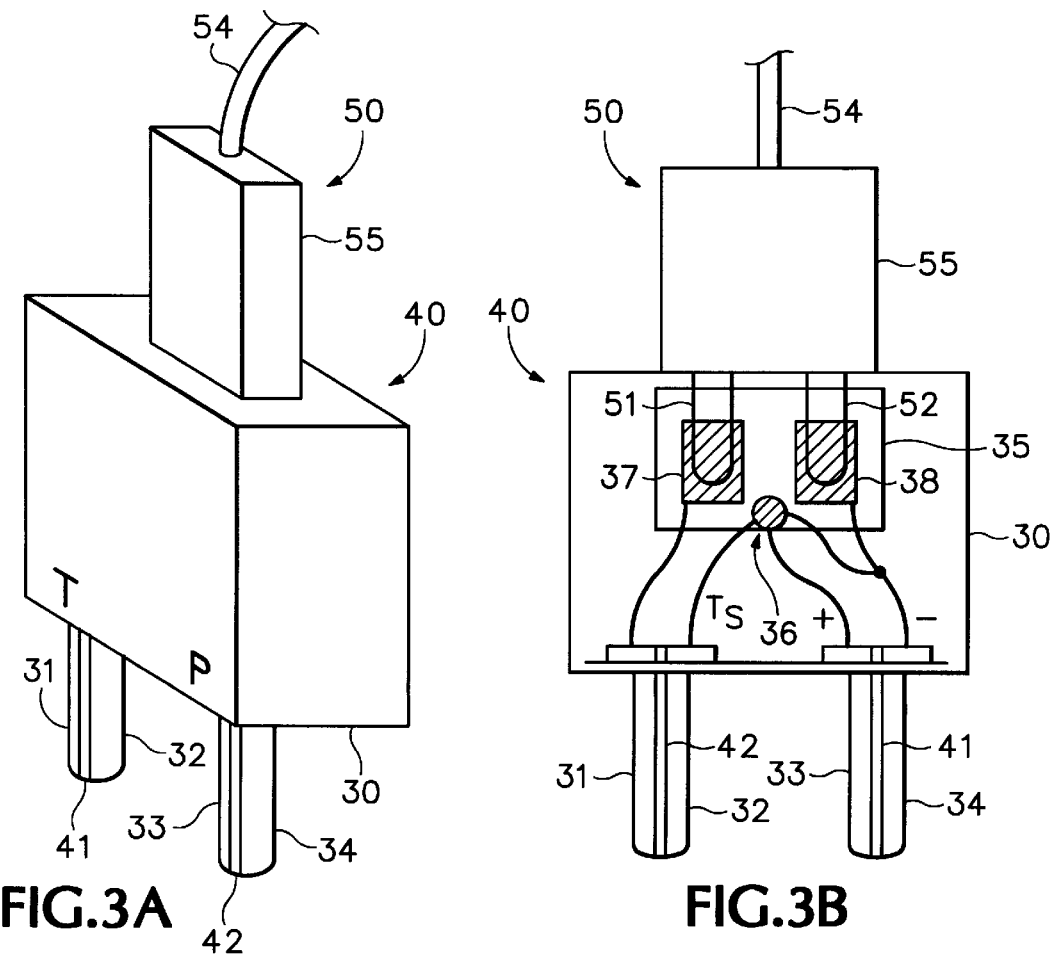
FIG. 3A  FIG. 3B

TEMPERATURE COMPENSATED ADAPTER FOR A DMM

FIELD OF THE INVENTION

This invention relates to temperature measurement using thermocouples, and more particularly to temperature measurement using thermocouple probes attached to a handheld multi-purpose instrument such as a digital multimeter or the like.

BACKGROUND OF THE INVENTION

When a junction is created between two dissimilar metals, a voltage is produced that depends both on the composition of the two metals and the temperature of the junction. Such a junction is known as a "thermocouple junction". The voltage produced by the thermocouple junction can be measured at different temperatures and recorded. Subsequently, an unknown temperature can be determined by putting the thermocouple in its environment, measuring the voltage it produces and comparing it with the stored voltage versus temperature data.

In practice, since the voltage of the thermocouple junction must be measured, the metals forming the junction have to be part of a circuit, and therefore there must be at least one other junction of dissimilar metals somewhere in that circuit. Thus, temperature measurements using thermocouples are performed by a circuit having both a measurement junction, and a reference, or "cold", junction. The voltage measured then represents the difference between the voltages produced by the measurement junction and the reference junction. If the temperature of the reference junction and the voltage-versus-temperature characteristic of the two metals used in the thermocouple junctions are both known, then the temperature at the measurement junction can be accurately established. The accuracy of a temperature measurement made with a thermocouple junction is thus limited by the accuracy of the temperature measurement of the temperature of the reference junction.

An alternative to measuring the voltage at the reference junction is to use some means for accurately establishing and maintaining that temperature at a predetermined level. For example, the known temperature of phase change, such as that created by mixture of water and ice. Hence, the name "cold junction". Obtaining extreme accuracy by this method also requires measurement of the ambient pressure and compensation for its deviation from the standard value. Several other methods and variations on methods are outlined in the following discussions of patents.

U.S. Pat. No. 3,650,154 to Arnett et al. for "Thermocouple Input Temperature Sensing Circuitry", hereby incorporated by reference, described circuitry that compares the thermocouple output voltage with a reference voltage and amplifies the difference. The reference voltage varies with ambient temperature in order to null out the effects of temperature change on the cold junction. The cold junction is disposed within the same region as the temperature indicating circuitry, so that differences between their temperatures are minimized.

U.S. Pat. No. 5,088,835 to Shigezawa et al. for "Reusable Probe Connector Apparatus", hereby incorporated by reference, discloses a phone plug apparatus housing in close proximity with both a cold junction and a thermistor. The thermistor output is chosen so as to compensate as closely as possible for the voltage generated by the cold junction, while their physical proximity in the plug are intended to assure that the cold junction and thermistor are actually operating at the same temperature. Electrically, the thermistor, cold junction and hot junction are all connected in series. The thermistor produces a change in voltage with respect to temperature that is opposite in polarity from the change in voltage with respect to temperature produced by the cold junction. With those two voltages canceling, the net voltage measured by circuitry in the instrument is interpreted as exclusively that coming from the hot junction.

U.S. Pat. No. 4,482,261 to Dewey et al. for "Method for Simultaneous Reference Junction Compensation of a Plurality of Thermocouples", hereby incorporated by reference, describes how multiple reference junctions are held to the same temperature by a metallic isothermal block. The temperature of that block is then monitored by an integrated circuit temperature transducer, the output of which is converted to a temperature by a microprocessor using either formula or lookup table based calculations.

U.S. Pat. No. 4,718,777 to Mydynski et al. for "Isothermal Block for Temperature Measurement System Using a Thermocouple", hereby incorporated by reference, disclosed a method for compensating for the temperature of the reference junction by maintaining it and a temperature sensor in an isothermal block. The temperature sensor tracks the temperature of the reference junction so that its effect could be accurately accounted for in calculating the temperature of the measurement junction. The focus of this patent is on the isothermal block, its high thermal conductivity, and its ability to mount to a printed circuit board.

The problem of determining and/or compensating for the temperature of the reference junction in a thermocouple-based temperature measurement system is made more difficult if the measurement system is mobile, such as is particularly the case if it is handheld. When the handheld instrument is moved to a new environment, various parts of the instrument will take different amounts of time to reach thermal equilibrium with the new ambient temperature.

U.S. Pat. No. 5,167,519 to Jones et al. for "Temperature Compensating Universal Connector", hereby incorporated by reference, describes a connector assembly having thermal and electrical features that make it very effective for connecting a mobile instrument to thermocouple sensors prepositioned in environments of varying temperature and through plugs and wires of different sizes and styles. The isothermal mass is minimized and the means for effective thermal coupling are maximized in order to optimize the transient response of the connector system as it is connected to thermal probes in different temperature environments.

Handheld instruments that are used exclusively for temperature measurement can have (and have had) an internal isothermal block. By thermally isolating this isothermal block from the rest of the instrument as much as possible, a temperature sensor located within this isothermal block can accurately track the temperature of a reference junction that is also embedded in the same isothermal block.

Multi-function handheld meters, particularly those that are primarily designed for making electrical measurements, such as voltage, current, resistance, and frequency, have size, weight, cost and safety concerns that make such a dedicated integral isothermal block more problematical and less desirable.

Nonetheless, if these multimeters are to make accurate temperature measurements, they must have some way to provide reference junction temperature measurement or compensation that is accurate and stable, as the handheld instrument is moved about to make measurements in environments having different ambient temperatures.

BRIEF SUMMARY OF THE INVENTION

In accordance with the invention, an adapter suitable for use with a handheld multimeter and a thermocouple probe is described. This adapter contains a temperature sensor and input connectors suitable for mating with standard thermocouple probes, with both of these closely coupled thermally to an isothermal domain. Plugs suitable for mating with the input jacks of a handheld multimeter are disposed within the adapter on the other side of a high thermal resistance zone. Conductors connect these outputs to the input connectors and to the leads of the temperature sensor. A four output version of the adapter is shown for use with a three lead temperature sensor, and a three output version is shown for use with a two lead temperature sensor. The output plugs can paired to be more compact and easier to use through the use of dual-signal single-axis banana plugs.

BRIEF DESCRIPTION OF THE SEVERAL VIEWS OF THE DRAWING

FIG. 1 is a simplified three dimensional view of a digital multimeter equipped with a conventional thermocouple temperature probe according to the prior art.

FIG. 3A is a simplified three dimensional view of a temperature compensated adapter according the present invention in mated contact with a conventional thermocouple probe.

FIG. 3B is a partially cut-away cross-sectional view of the temperature compensated adapter according to the present invention in mated contact with a conventional thermocouple probe temperature probe according to the prior art.

DETAILED DESCRIPTION OF THE INVENTION

FIG. 1 illustrates the usual way that multimeters are presently used to make measurements with a thermocouple probe 50. The measurement thermocouple junction 60 is disposed at the far end of a thermocouple cable 54. The thermocouple cable typically contains wires of two dissimilar metals. The two wires of the thermocouple cable 54 form a second thermocouple junction, the reference or "cold" junction, within a probe plug housing 55.

Figure 2:
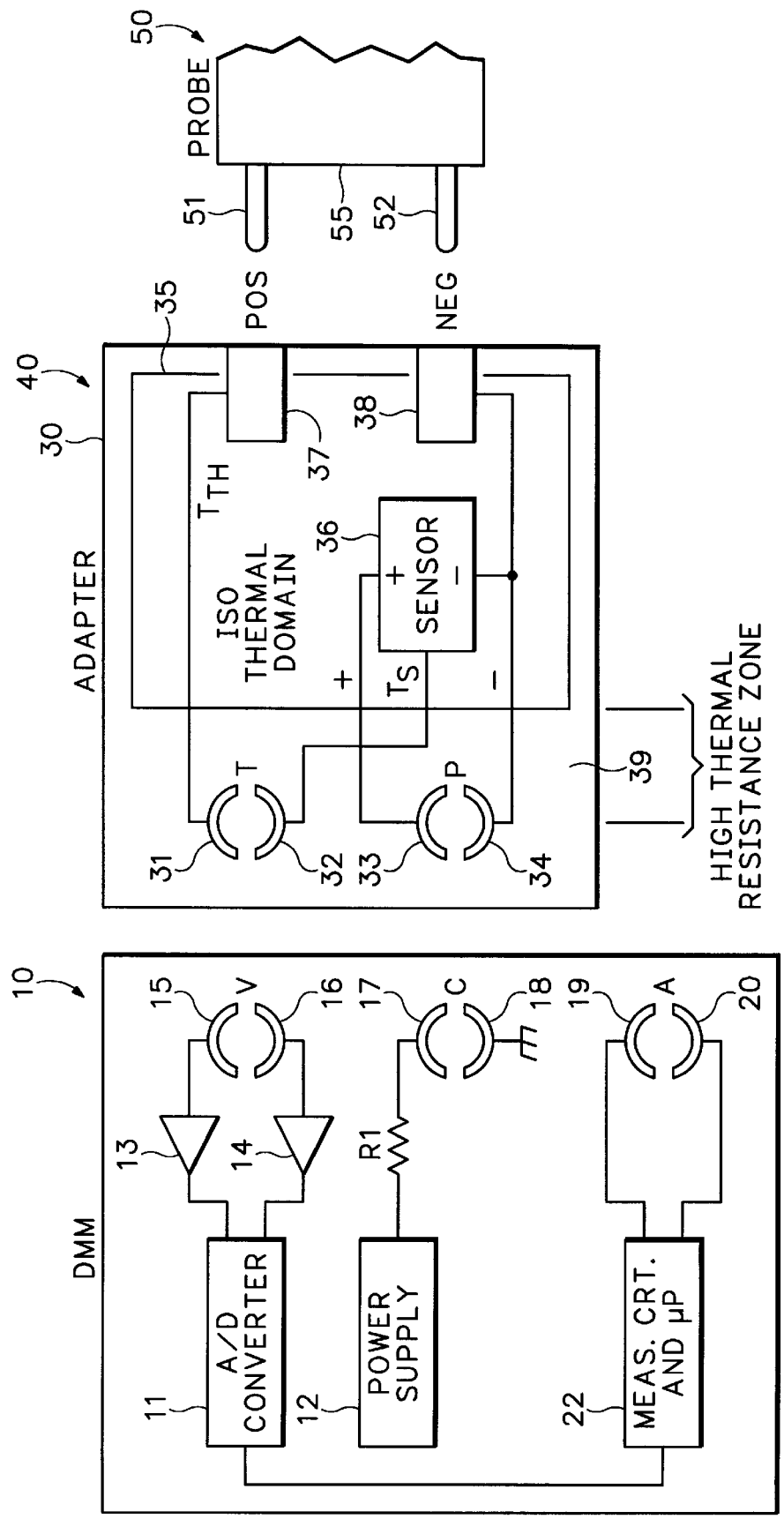
FIG. 2 is a partial schematic and block diagram of a four-terminal temperature compensated adapter according to the present invention and the digital multimeter with which it connects.

Referring now to the right side of FIG. 2, the thermocouple probe 50 has two male connector terminals 51 and 52 protruding from the probe plug housing 55. In FIG. 1 these connector terminals 51 and 52, are not visible, but are present and are inserted within corresponding receptacles (also not visible) of the digital multimeter 100. While the intent is to have these receptacles internal to the digital multimeter be in close thermal contact with an internal temperature sensor and with the external reference thermocouple that is located in the probe plug housing 55 of the thermocouple probe 50, there are limits to how well this can be achieved with this type of design. There is also an intent in these previous designs to thermally insulate the internal temperature sensor from the temperature fluctuations that occur within the rest of the handheld instrument as it is moved about and warms up from heat dissipation due to the operation of its own internal electronics. However, again, there are limits as to how well this goal can be achieved within the constraints imposed by this basic design architecture.

Referring now to all of FIG. 2, a thermocouple probe to DMM adapter 40 according to the present invention provides the desired solution when it is interposed between a digital multimeter instrument 10 according to the present invention and a conventional thermocouple probe 50 according to the prior art.

Starting on the left of FIG. 2, the digital multimeter 10 according to the present invention has measurement circuitry and a microprocessor 22 as is well known in the prior art. A/D converter 11 supplies digital words to the measurement circuitry and microprocessor 22 representative of the inputs that it (switchably) receives from amplifiers 13 and 14. Amplifiers 13 and 14 receive their inputs, respectively, from first 15 and second 16 electrically isolated (from each other) contact areas of dual-signal, single-axis voltage jack V. The first 17 and second 18 electrically isolated (from each other) contact areas of dual-signal, single-axis common jack C are connected, respectively, to power supply 12 and the ground plane of the DMM 10. Although not pertinent to the discussion that follows, the first 19 and second 20 electrically isolated (from each other) contact areas of dual-signal, single-axis current jack A are connected to two nodes in the measurement circuitry and microprocessor 22 portion of the digital multimeter (DMM) 10.

Progressing now to the center portion of FIG. 2, the adapter 40 according to the present invention has a plastic case 35 that is not thermally conductive, two dual-signal single-axis plugs T and P appropriate for mating, respectively, with jacks V and C of the DMM 10. The first 31 and second 32 electrically isolated (from each other) contact areas of dual-signal, single-axis temperature plug T are connected to, respectively, the POSitive thermocouple probe connector receptacle 37 and the $T_S$ output of temperature sensor 36 and forming first and second signal output connectors, respectively. The first 33 and second 34 electrically isolated (from each other) contact areas of dual-signal, single-axis power plug P are connected to, respectively, the + and − inputs of temperature sensor 36 and forming third and fourth signal output connectors, respectively. The NEGative thermocouple probe connector receptacle 38 is also connected to the second 34 electrically isolated (from each other) contact area of dual-signal single-axis power jack P.

The temperature sensor 36 is closely coupled thermally with isothermal domain 35, as are probe connector receptacles 37 and 38. When the connector terminals 51 and 52 of the thermocouple probe 50 are mated with the probe connector receptacles 37 and 38, a close thermal coupling results between the isothermal domain 35 and the reference thermocouple (not shown) of the thermocouple probe 50.

The isothermal domain 35 is to the maximum extent possible thermally isolated from the first 31 and second 32 contact areas and first and second contact areas 33 and 34 of the dual-signal, single-axis temperature plugs T and P by high thermal resistance zone 39.

In operation, connector terminals 51 and 52 of thermocouple probe 50 are inserted into connector receptacles 37 and 38, respectively, of thermocouple probe to DMM adapter 40, and dual-signal, single-axis temperature plugs T and P of thermocouple probe to DMM adapter 40 are inserted into dual-signal single-axis voltage jacks V and C, respectively, of DMM 10. Connector receptacles 37 and 38 form first and second signal input connectors.

When plug T is inserted into jack V, the first and second contact areas 31 and 32 contact areas of dual-signal, single-as temperature plug T are brought into electrical contact with, respectively, the first and second contact areas 15 and 16 of dual-signal, single-axis voltage jack V. An electrical pathway is then completed from a first side of the reference thermocouple (not shown) of thermocouple probe 50 through connector terminal 51 to the POSitive thermocouple probe connector receptacle 37 over analog signal line $T_{TH}$, and on to the first contact area of plug T and the first contact area of jack V to the input of amplifier 13, and from the output of amplifier 13 on to analog-to-digital converter 11. At the same time, another electrical pathway is completed from the T output of the temperature sensor 36 to the second contact area of plug T and the second contact area of jack V to the input of amplifier 14, and from the output of amplifier 14 on to analog-to-digital converter 11. Switching (not shown) allows analog-to-digital converter 11 to alternately measure the outputs of both amplifier 13 and amplifier 14, and forward the results to measurement circuit and microprocessor 22 for analysis of these two electrical voltage levels and the difference between them to obtain the temperature of the measurement thermocouple 60 (only shown in FIG. 1).

When plug P is inserted into jack C, the first and second contact areas 33 and 34 contact areas of dual-signal, single-axis temperature plug P are brought into solid thermal and electrical contact with, respectively, the first and second contact areas 17 and 18 of dual-signal single-axis common jack C. An electrical pathway is then completed from the power supply 12, through R1, the first contact area 17 of common jack C, the first contact area power plug P, to the + side of temperature sensor 36. The power supply return follows the path from the − side of the temperature sensor 36 through the second contact area of the power plug P, through the second contact area of the common jack C, where it connected to the common ground plane of the DMM 10, which also provides the ground connection for the power supply 12, as well as amplifiers 13 and 14, A/D converter 11, and the measurement circuitry and microprocessor 22. The ground return (i.e., common connection) through the first contact area 18 of common jack C and power plug P, is also connected to the NEGative thermocouple probe connector receptacle 38, and through connector terminal 52 to the second side of the reference thermocouple junction (not shown) in thermocouple probe 50.

Returning for a moment to R1, its value is chosen to be large enough to limit the current flow to ground when the common jack C is used with a single-signal plug that causes a connection between the first 17 and second 18 contact areas, and to be small enough to not drop too much voltage when the common jack C is used to carry power to the adapter 40 of the present invention. Typically, a suitable value for R1 will be in the range of 10K to 100K ohms.

Referring next to FIG. 3A, we can see a typical (prior art) thermocouple probe 50 connected to the thermocouple probe to DMM adapter 40 according to the present invention. The probe plug housing 55 is flush with the plastic case 30 of the adapter 40. The reference thermocouple is not visible, but is inside of the probe plug housing 55. Thermocouple cable 54 is shown entering the probe plug housing 55 at its near end, and is connected at its distal end (not shown) to the measurement thermocouple 60 (not visible here, but visible in FIG. 1). Markings identifying plugs T and P are visible on the side of plastic case 30. Plug T comprises contact areas 31 and 32, which are electrically isolated from each other by insulative separator 41. Plug P comprises contact areas 33 and 34, which are electrically isolated from each other by insulative separator 42.

Referring now to FIG. 3B, all of the same elements visible in FIG. 3A are visible here too, but here we have a cut-away view that exposes the internal elements of the adapter 40. Connector receptacles 37 and 38 are seen to have connector terminals 51 and 52 inserted within them. (Here, for clarity, connector receptacles 37 and 38 are shown shorter than they are and therefore not engaging with as much of the connector terminals 51 and 52 as they do in an actual embodiment that maximizes thermal conductivity between the two.) The connector receptacles 37 and 38 are closely thermally coupled to the isothermal domain 35, which is made of ceramic or other material that is highly thermally conductive while at the same time electrically insulating. The temperature sensor 36 is also closely thermally bonded to the isothermal domain material by a bonding agent that is highly thermally conductive. An electrically conductive lead $T_{TH}$ with minimum thermal conductivity (due, e.g., to the use of a small wire gauge) connects connector receptacle 37 to the first contact area 31 of the temperature plug T. Another such lead $T_S$, connects the output of the thermal sensor 36 to the second contact area of temperature plug T. Yet another such lead, labeled "+", provides the positive side of the supply voltage from first contact area 33 to the positive power input of the temperature sensor 36. A fourth lead of the same type connects the negative power terminal of the temperature sensor 36 and connector receptacle 38 to the second contact area of the power plug P. These connections are the physical implementation of the schematic connections shown in the middle, adapter portion of FIG. 2.

With the temperature of the adapter 40 known from the $T_S$ voltage, the assumption that the reference thermocouple temperature is the same as the temperature of the adapter, the difference voltage across the two ends of the reference thermocouple as measured across $T_{TH}$ to the common voltage, and the voltage-versus-temperature characteristics of the thermocouple probe 50, very accurate temperatures can be calculated for the measurement thermocouple 60 of the thermocouple probe and its environment. A combination or lookup tables and/or formulas can be used in making these calculations.

Figure 4:
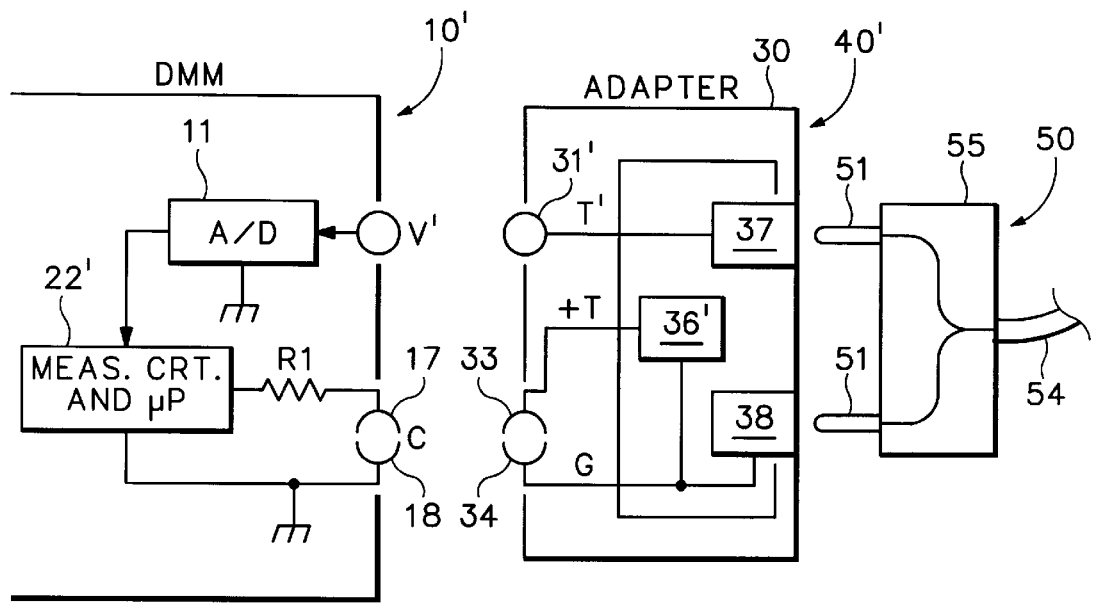
FIG. 4 is a partial schematic and block diagram of a three-terminal temperature compensated adapter according to the present invention and the digital multimeter with which it connects.

It is also possible to build a three-terminal thermocouple probe to DMM adapter 40' according to the present invention. The circuitry of this three terminal adapter and a partial schematic of the digital multimeter with which it connects are shown in FIG. 4. This approach relies on a different version of the temperature sensor 36' and on the ability of the measurement circuitry and microprocessor 22' to supply power and transmit and receive digital data on the same line. As can be seen along the top of FIG. 4, the V' jack and T' plug only carry a single signal, the analog voltage from the first side of the reference thermocouple (not shown). The temperature information that had been communicated by the analog signal "T" in the four terminal version of the adapter 40, has been digitized at the temperature sensor 36' and carried on the positive power line, which is now identified as "+T". The measurement circuitry and microprocessor 22' now provide power to the temperature sensor 36', and additionally transmit and receive digital serial data over the same line. Alternatively, another way to obtain a three terminal adapter is to use a resistor or thermistor, whose temperature versus voltage characteristic is stable and known, as the temperature sensor 36".

Figure 5:
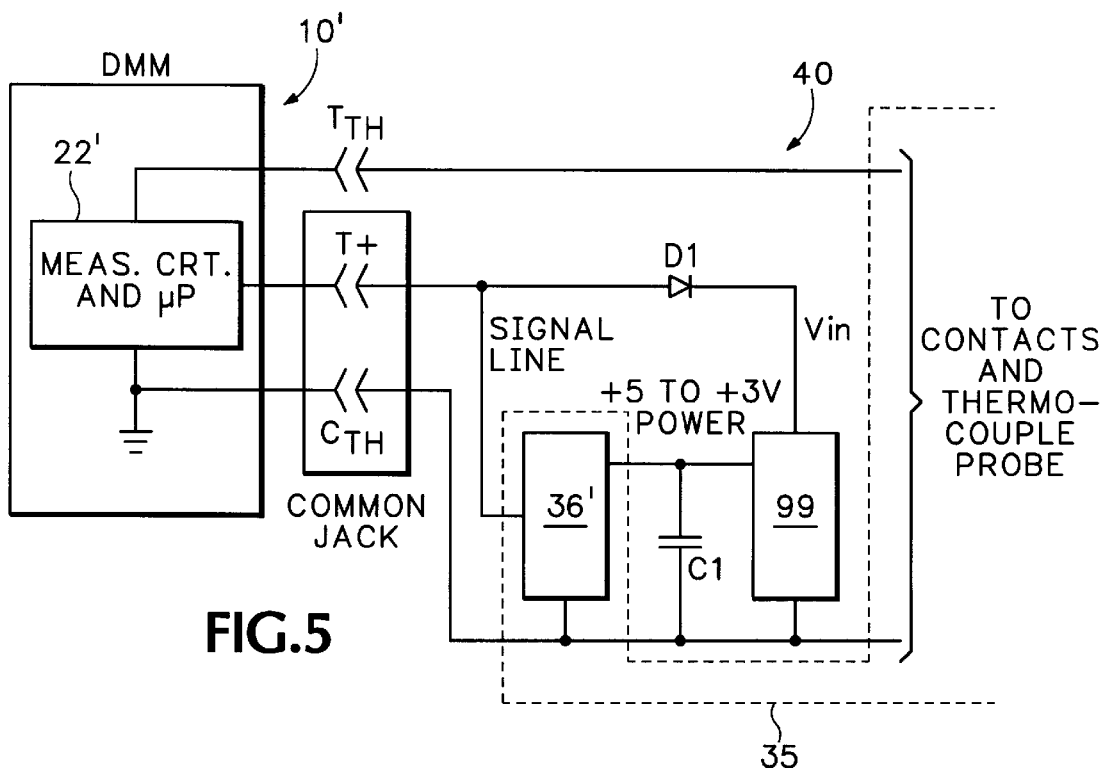
FIG. 5 is a more detailed partial schematic and block diagram focusing on part of the contents of FIG. 4, in particular the circuitry providing power and supporting communication from the measurement circuitry and microprocessor of the DMM to the temperature sensor.
Figure 6:
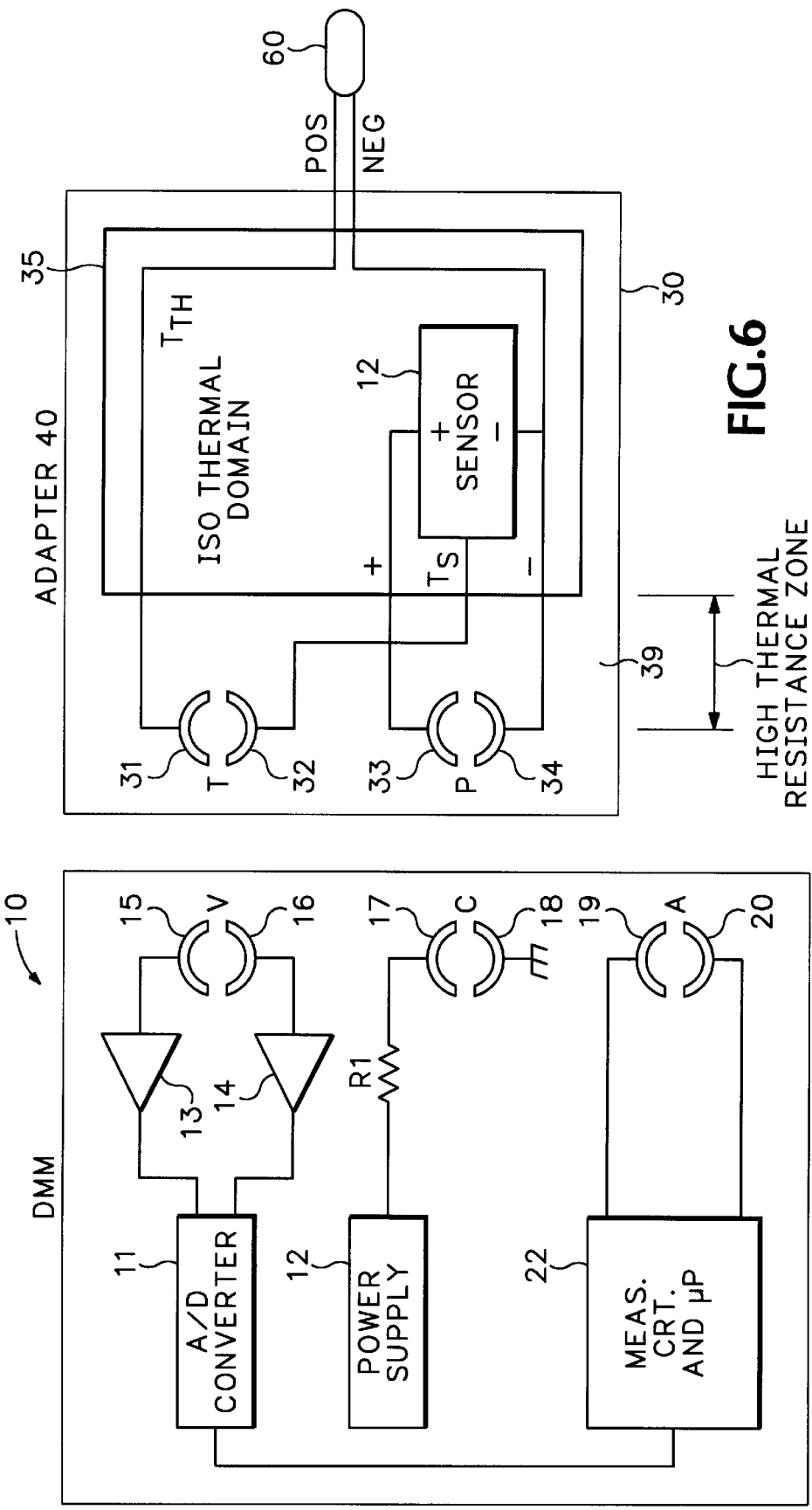
FIG. 6 is a partial schematic and block diagram of another four-terminal temperature compensated adapter according to the present invention and the digital multimeter with which it connects.

Looking at one implementation in more detail, we refer to FIG. 5. In this implementation, the sensor 36' is a DALLAS Semiconductor DS1820 1-Wire™ Digital Thermometer, and it is in close thermal contact with the isothermal domain 35. As is described in detail in its documentation, the DALLAS Semiconductor DS1820 1-Wire™ Digital Thermometer can operate from two different sources of power: directly from the data line +T using "parasitic" power mode, or indirectly from a local power source 99. Further information on the DS1820 or other DALLAS Semiconductor products can be obtained by contacting them at their web site: http://www.dalsemi.com/.

In the example shown in FIG. 5, the local power source 99 is a Maxim MAX867 3.3V/5V or Adjustable-Output, Single-Cell DC—DC Converter. The local power source 99 supplies an output DC level that is higher than the +3V that it receives from the data line +T. For limited periods of time the local power source and capacitor C1, which is typically 1 $\mu$F, maintains this local voltage source, and thereby permits communication to occur between the measurement and microprocessor circuitry 22' and the sensor 36'. It is able to do this using energy that it stores on C1 during periods of time that the line +T is provided with a "strong pull-up" to the +3V supply by the measurement circuitry and microprocessor 22'. A "strong pull-up" is a low impedance connection, such as that provided by a MOS FET.

When the measurement circuitry and microprocessor 22' of the DMM 10 wants to initiate communication with the sensor 36', it changes the "strong pull-up" to a 5K$\Omega$ pull-up resistor, thereby enabling digital communication on +T line by permitting the devices at either end to pull the voltage on the +T line down to 0V. The duration of this communication interval is limited by the size of the charge on C1. Diode D1 permits current flow to supply the DC-to-DC local power source 99, but blocks return current along that path when the +T line is pulled low during communication. The measurement circuitry and microprocessor 22' controls communication on the +T line, permitting it with the 5K ohm pull-up, supplying time and energy for a temperature measurement by switching the "strong pull-up" on.

When the sensor 36' operates in its temperature sensing mode, which requires about 1 ma of current, the sensor needs to be powered and cannot communicate. Communication on the one hand, and measurement taking or other current intensive activities of the temperature sensor 36' on the other, alternate in time, with the DC-to-DC converter 99 and the sensor 36' both obtaining their current from the measurement circuitry and microprocessor 22' during the intervals between communication sessions.

Continuing with the rest of FIG. 5, the common signal from the reference thermocouple junction $C_{TH}$ connects with the common return from the sensor 36', as it did in the four terminal version of this invention. Similarly, the line carrying the voltage level of the first side of the reference thermocouple junction, $T_{TH}$, directly connects to the plug and jack that couples it to the measurement circuitry and microprocessor 22', as in the four terminal version.

While a preferred embodiment of the present invention has been shown and described, it will be apparent to those skilled in the art that many changes and modifications may be made without departing from the invention in its broader aspects. For example, jacks could be substituted for plugs and plugs substituted for jacks, or other connectors means substituted for both. Also, a wide range of materials could be used for thermal conduction or insulation. The temperature sensor could be of a two-terminal type, such as a resistor or some other device. Or, the thermocouple probe could be permanently connected, dispensing with the need for the connector receptacles and connector terminals (i.e., common connection). The claims that follow are therefore intended to cover all such changes and modifications as are permitted by the patent laws of the respective countries in which this patent is granted.

What is claimed is:

1. An adapter for use in making thermocouple based temperature measurements using a handheld multimeter and a thermocouple probe, the multimeter having three or more signal input connectors, and the thermocouple probe having first and second voltage output connectors, with a voltage difference between the first and second voltage output connectors being representative of a temperature difference between a measurement thermocouple junction and a reference thermocouple junction, the reference thermocouple junction being located near and being closely thermally coupled with the first and second voltage output terminals, the adapter comprising:

an isothermal material defining an isothermal domain within a first portion of the adapter;

a first signal input connector for connecting the adapter to the first voltage output terminal of the thermocouple probe, the first signal input connector being closely thermally coupled to the isothermal domain;

a second signal input connector for connecting the adapter to the first voltage output terminal of the thermocouple probe, the second signal input connector being closely thermally coupled to the isothermal domain;

a temperature sensor, the temperature sensor being closely thermally coupled to the isothermal domain, and having a power supply input, a common connection, and producing a temperature output voltage signal at a temperature signal output, the level of the temperature output voltage signal being indicative of the temperature sensed by the temperature sensor;

a thermal resistance material defining a thermal resistance zone within a second portion of the adapter;

a first signal output connector for connecting the adapter to a first terminal of the handheld multimeter, the first signal output connector being electrically coupled to the first signal input connector and thermally isolated from the isothermal domain by the thermal resistance zone;

a second signal output connector for connecting the adapter to a second terminal of the handheld multimeter, the second signal output connector being electrically coupled to the second signal input connector and the common connection of the temperature sensor and being thermally isolated from the isothermal domain by the thermal resistance zone; and a third signal output connector for connecting the adapter to a third terminal of the handheld multimeter, the third signal output connector being electrically coupled to the temperature output for conveying the temperature output voltage signal and being thermally isolated from the isothermal domain by the thermal resistance zone.

2. An adapter according to claim 1 further comprising a fourth signal output connector for connecting the adapter to a fourth terminal of the handheld multimeter, with the fourth signal output connector being electrically coupled to the power supply input of the temperature sensor.

3. An adapter according to claim 2 wherein the first and second signal output connectors are both part of a same dual-signal single-axis plug.

4. An adapter according to claim 3 wherein the same dual-signal single-axis plug is a "banana"-type plug.

5. An adapter according to claim 4 wherein the third and fourth signal output connectors are both part of a same dual-signal single axis plug.

6. An adapter according to claim 5 wherein the same dual-signal single-axis plug is a "banana"-type plug.

7. An adapter according to claim 1 wherein the first and second signal output connectors are both part of a same dual-signal single-axis plug.

8. An adapter according to claim 7 wherein the same dual-signal single-axis plug is a "banana"-type plug.

9. An adapter according to claim 8 wherein the third and fourth signal output connectors are both part of a same dual-signal single axis plug.

10. An adapter according to claim 9 wherein the same dual-signal single-axis plug is a "banana"-type plug.

11. An adapter according to claim 1 wherein the third signal output connector is also electrically coupled to the power supply input of the thermocouple, and both power and the temperature output voltage signal share the same path through the third signal output connector.

12. A combination of an adapter and a thermocouple probe for use in making thermocouple based temperature measurements using a handheld multimeter, the multimeter having three or more signal input connectors, and the thermocouple probe having first and second voltage output connectors, with a voltage difference between the first and second voltage output connectors being representative of a temperature difference between a measurement thermocouple junction and a reference thermocouple junction, the reference thermocouple junction being located near and being closely thermally coupled with the first and second voltage output terminals, the combination comprising:

an isothermal material defining an isothermal domain within a first portion of the adapter;

a first signal input being closely thermally coupled to the isothermal domain and permanently connected to the first voltage output terminal of the thermocouple probe;

a second signal input being closely thermally coupled to the isothermal domain and permanently connected to the second voltage output terminal of the thermocouple probe;

a temperature sensor, the temperature sensor being closely thermally coupled to the isothermal domain, and having a power supply input, a common connection, and producing a temperature output voltage signal at a temperature signal output, the level of the temperature output voltage signal being indicative of the temperature sensed by the temperature sensor;

a thermal resistance material defining a thermal resistance zone within a second portion of the adapter;

a first signal output connector for connecting the adapter to a terminal of the handheld multimeter, the first signal output connector being electrically coupled to the first signal input connector and thermally isolated from the isothermal domain by the thermal resistance zone;

a second signal output connector for connecting the adapter to the handheld multimeter, the second signal output connector being electrically coupled to the second signal input connector and the common connection of the temperature sensor and being thermally isolated from the isothermal domain by the thermal resistance zone; and a third signal output connector for connecting the adapter to the handheld multimeter the third signal output connector being electrically coupled to the temperature output for conveying the temperature output voltage signal and being thermally isolated from the isothermal domain by the thermal resistance zone.

13. The combination according to claim 12 further comprising a fourth signal output connector for connecting the adapter to the handheld multimeter, with the fourth signal output connector being electrically coupled to the power supply input of the temperature sensor.

* * * * *